(12) United States Patent
Furuness et al.

(10) Patent No.: US 7,729,386 B2
(45) Date of Patent: Jun. 1, 2010

(54) SYSTEMS AND METHODS FOR FRAME SYNCHRONIZATION

(75) Inventors: Sean M. Furuness, Naperville, IL (US); Lawrence D. Weizeorick, Lisle, IL (US); Steve J. Butz, Crystal Lake, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1772 days.

(21) Appl. No.: 10/234,821

(22) Filed: Sep. 4, 2002

(65) Prior Publication Data

US 2004/0042498 A1    Mar. 4, 2004

(51) Int. Cl.
*H04J 3/06* (2006.01)
(52) U.S. Cl. .................. 370/514; 370/324; 370/350; 370/503; 375/368; 375/364
(58) Field of Classification Search ............ 370/503, 370/506, 509, 510, 513, 514, 324, 350; 375/365, 375/368, 372, 366, 370, 364
See application file for complete search history.

(56) References Cited

U.S. PATENT DOCUMENTS

| | | | | |
|---|---|---|---|---|
| 4,727,558 A | | 2/1988 | Hall | |
| 5,049,880 A | * | 9/1991 | Stevens | ............... 341/63 |
| 5,280,532 A | * | 1/1994 | Shenoi et al. | ............. 370/474 |
| 5,426,756 A | * | 6/1995 | Shyi et al. | ............... 711/159 |
| 5,615,237 A | * | 3/1997 | Chang et al. | ............. 375/368 |
| 5,790,599 A | * | 8/1998 | Wright et al. | ............. 375/240 |
| 6,246,736 B1 | * | 6/2001 | Coady | ............... 375/368 |
| 6,546,241 B2 | * | 4/2003 | Iyengar et al. | ............ 455/412.1 |
| 6,859,460 B1 | * | 2/2005 | Chen | ............... 370/412 |
| 2003/0128719 A1 | * | 7/2003 | Doyle | ............... 370/509 |

* cited by examiner

*Primary Examiner*—Jason E Mattis
*Assistant Examiner*—Kibrom T Hailu
(74) *Attorney, Agent, or Firm*—Hamilton, Brook, Smith & Reynolds, P.C.

(57) ABSTRACT

Systems and methods are disclosed for detecting framing data in a telecommunications signal. In one embodiment, a frame synchronizer circuit is provided that includes an interface for receiving bits of a telecommunications signal and storage for storing a framing state for the bit positions in the frame, the framing state for a given bit position indicating whether that bit position is a potential holder of the frame synchronization pattern. The frame synchronizer circuit also contains a state update function that determines the current-state for each bit position based on the bit position's previous state, and the value of the most recently received bit in that bit position. The encoding scheme makes use of shorter bit length symbols to represent statistically more frequently occurring states. In one embodiment, a single code word is used to record the state of a sequence of consecutively occurring bit positions that share the same state.

14 Claims, 9 Drawing Sheets

SYSTEMS AND METHODS FOR FRAME SYNCHRONIZATION

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to telecommunications. More specifically, systems and methods are disclosed for framing a telecommunications signal.

BACKGROUND OF THE INVENTION

Many digital serial telecommunications signals have a frame structure, with some bit positions within the frame designated to carry payload data, and some bit positions designated to carry transport overhead. Transport overhead includes administrative information needed to successfully transport the payload data, such as parity and frame synchronization data.

A circuit that receives a serial bit stream typically contains a frame synchronizer that monitors the incoming bit stream, finds the frame synchronization pattern, and provides a frame synchronization signal to the rest of the circuit. The frame synchronization signal is based on the position of the frame synchronization pattern within the frame, and is used by the rest of the circuit to extract payload and overhead data from the bit stream.

SUMMARY OF THE INVENTION

Systems and methods are disclosed for framing a telecommunications signal. It should be appreciated that the present invention can be implemented in numerous ways, including as a process, an apparatus, a system, a device, a method, a computer readable medium, or as a combination thereof. Several inventive embodiments of the present invention are described below.

In one embodiment, a frame synchronizer circuit is provided that includes an interface for receiving bits of a telecommunications signal, state update logic for determining the framing state of each bit, and storage for storing the framing state. The framing state for a given bit position indicates whether that bit position is a potential holder of the frame synchronization pattern. The state encoding scheme uses shorter bit-length symbols to represent statistically more frequently occurring states. In one embodiment, a single code word can be used to store the state information for a number of consecutively occurring bit positions that have the same state.

In another embodiment, a method for detecting a frame synchronization pattern in a telecommunications signal is provided. As a stream of telecommunications data is received, encoded state information is stored for portions (e.g., bit positions) of the stream. The encoded state information for a given portion of the signal indicates whether that portion displays part of the frame synchronization pattern. A state that occurs with a relatively high frequency, such as the state indicating that a given portion of the signal does not display the frame synchronization pattern, is represented by a different type of encoding than states that occur with a statistically lesser frequency. For example, a high frequency state can be represented by an encoding that uses fewer bits, and/or sequences of such states can be encoded using a single code word that indicates the state and the number of consecutive bit positions in the sequence.

In another embodiment, a method for synchronizing a telecommunications signal is provided. The signal is made up of frames, each frame having multiple bits. When a bit is received, previous-state information corresponding to the relative position of the received bit in the frame is retrieved from memory. This previous-state information is used to determine whether the received bit forms part of a valid frame synchronization pattern. If a determination is made that the received bit might form part of a valid frame synchronization pattern, updated previous state information is stored for that bit. However, if a determination is made that the received bit does not form part of a valid frame synchronization pattern, compressed state information is stored indicative of that determination. For example, the compressed state information could include a single bit indicating that the received bit is not a framing bit, combined with an indication of the number of consecutive bits for which the same determination has been made.

In yet another embodiment, a system for synchronizing frames in a telecommunications signal is provided. The system includes an interface for receiving the telecommunications signal; a memory for storing encoded framing state data for the bit positions within a frame; and state update logic for determining a current state for a given bit position based on a received bit and the previous state for that bit position. The system also includes an encoder for encoding the current state data for storage in memory. The encoder uses data compression to reduce the amount of storage needed to store the framing state data.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by referring to the following detailed description in conjunction with the accompanying drawings, wherein like reference numerals designate like structural elements, and in which.

DETAILED DESCRIPTION

A detailed description of the invention is provided below. While the invention is described in conjunction with several embodiments, it should be understood that the invention is not limited to any one embodiment. On the contrary, the scope of the invention is limited only by the appended claims and encompasses numerous alternatives, modifications, and equivalents. For example, while embodiments are described in the context of PDH signals such as DS1, those skilled in the art will recognize that the disclosed systems and methods are readily adaptable for broader application to signals of other types. In addition, while numerous specific details are set forth in the following description in order to provide a thorough understanding of the present invention, the present invention may be practiced according to the claims without some or all of these details. Finally, for the purpose of clarity, certain technical material that is known in the art has not been described in detail in order to avoid obscuring the present invention.

Figure 1A:
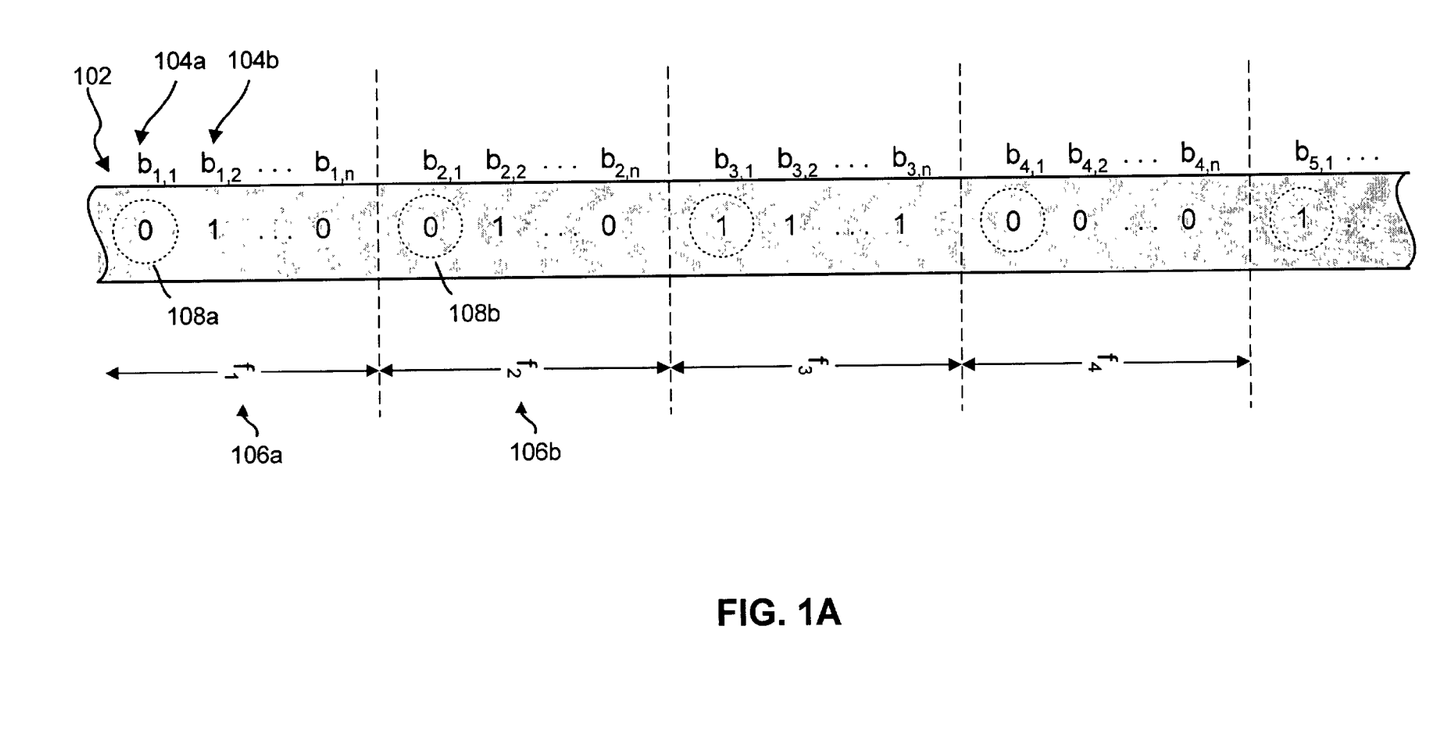
FIG. 1A shows an illustrative telecommunications signal.

Many telecommunications streams have a frame structure and a synchronization pattern that is distributed in the same bit position across multiple frames, typically one bit per frame. For example, PDH signals such as DS1 fall within this class of signals. FIG. 1A illustrates such a data stream. As shown in FIG. 1A, data stream 102 consists of a sequence of bits 104, grouped into frames 106. Each frame has a predefined number of bits, n, and includes a framing bit 108 in a predefined bit position for use in determining frame boundaries. In the example shown in FIG. 1A, the framing bit 108 is the first bit in each frame (i.e., the bit in bit position $b_{x,1}$, where x is the frame number). The values of the framing bits in successive frames (i.e., $b_{1,1}$, $b_{2,1}$, $b_{3,1}$, etc.) form a framing pattern (i.e., 001011 in the example shown in FIG. 1A and discussed in more detail below). The framing bits can thus be detected by examining the bit stream for the bit position that exhibits this pattern. It will be appreciated that FIG. 1A is provided to facilitate explanation of various embodiments of the present invention, and that the present invention could be readily adapted for use with signals with different formats.

A frame synchronizer circuit in accordance with one embodiment of the present invention includes an interface for receiving bits of a telecommunications signal, a storage function that stores the framing state of each bit position in a frame of data, and a state update function that determines the current state of each bit position as a frame synchronization pattern candidate based on (a) the bit position's previous state, retrieved from storage, and (b) the value of the incoming data bit in the same relative position in the frame. The state update function is designed so that each bit is tracked as a potential candidate until an "illegal" transition is detected, at which point that bit position is assigned a "lockout" state and is removed from consideration as a framing candidate. If there is only one framing bit per frame, all bit positions except one will eventually advance to the lockout state. Bits assigned to the lockout state do not transition to an active state until the framer is re-initialized.

The frame synchronizer considers each bit position within the frame as a candidate for containing the frame synchronization pattern. However, due to the effectively random nature of telecommunications signals when observed on a bit-by-bit basis, it may take many frames of data to rule out any given bit position, since it is likely that some bit positions will mimic the framing pattern for some period of time. For example, in FIG. 1A, bit position $b_{x,n}$ mimics the framing pattern displayed by the true framing bit position $b_{x,1}$.

The average speed with which the frame synchronizer finds the framing pattern depends on how many bit positions can be checked in parallel. A basic implementation would have a storage function large enough to save the state of each bit within the frame so that all bit positions could be checked in parallel. This implementation is memory intensive, and the size of the storage function typically dominates the area of the design.

Another possibility is a scheme that uses less memory and only looks at a portion of a frame at a time, observes that portion until either a framing pattern is found or all candidates are ruled out, and then checks the next portion of the frame. A problem with this method is that due to the random nature of telecommunications signals, some bit positions that do not contain the actual framing bits may nevertheless exhibit the framing pattern for many frames, and keep the framer from progressing (these are called "mimic" patterns). Since each memory location is used to monitor multiple, set bit positions within the frame, a memory location can get tied up following a mimic and not be able to progress to find the actual framing pattern in another bit position. This can result in relatively long reframe times and slow performance.

In an embodiment of the present invention, a frame synchronizer is implemented with reduced memory requirements and significantly less reduction in framer performance. The reduced memory requirements can be achieved by using data compression on the states encoded in memory. The states are encoded using a scheme that takes advantage of the statistical nature of telecommunications signals, and the fact that each bit position except the one that actually contains the framing pattern will eventually exhibit a pattern that rules it out as a framing pattern candidate.

In a preferred embodiment, this lockout state is encoded using as few bits as possible. In an example implementation, described below, high compression is achieved by encoding consecutive lockout states in one code word that includes a count of the consecutive lockout states. The memory can be sized so that it cannot track all the bit positions within a frame until a certain number of bits have transitioned to the lockout state and a minimum amount of data compression has been achieved. This implementation has the advantage that no single mimic pattern can cause the framer to have excessive reframe times, since the dynamic nature of the data compression function does not tie certain memory locations to certain bit positions. It also has the advantage that the framer can work with any memory larger than some minimum based on the encoding scheme that is used. If high speed is not a requirement, a very small memory can be used with virtually no increase in frame synchronizer complexity.

Figure 1B:
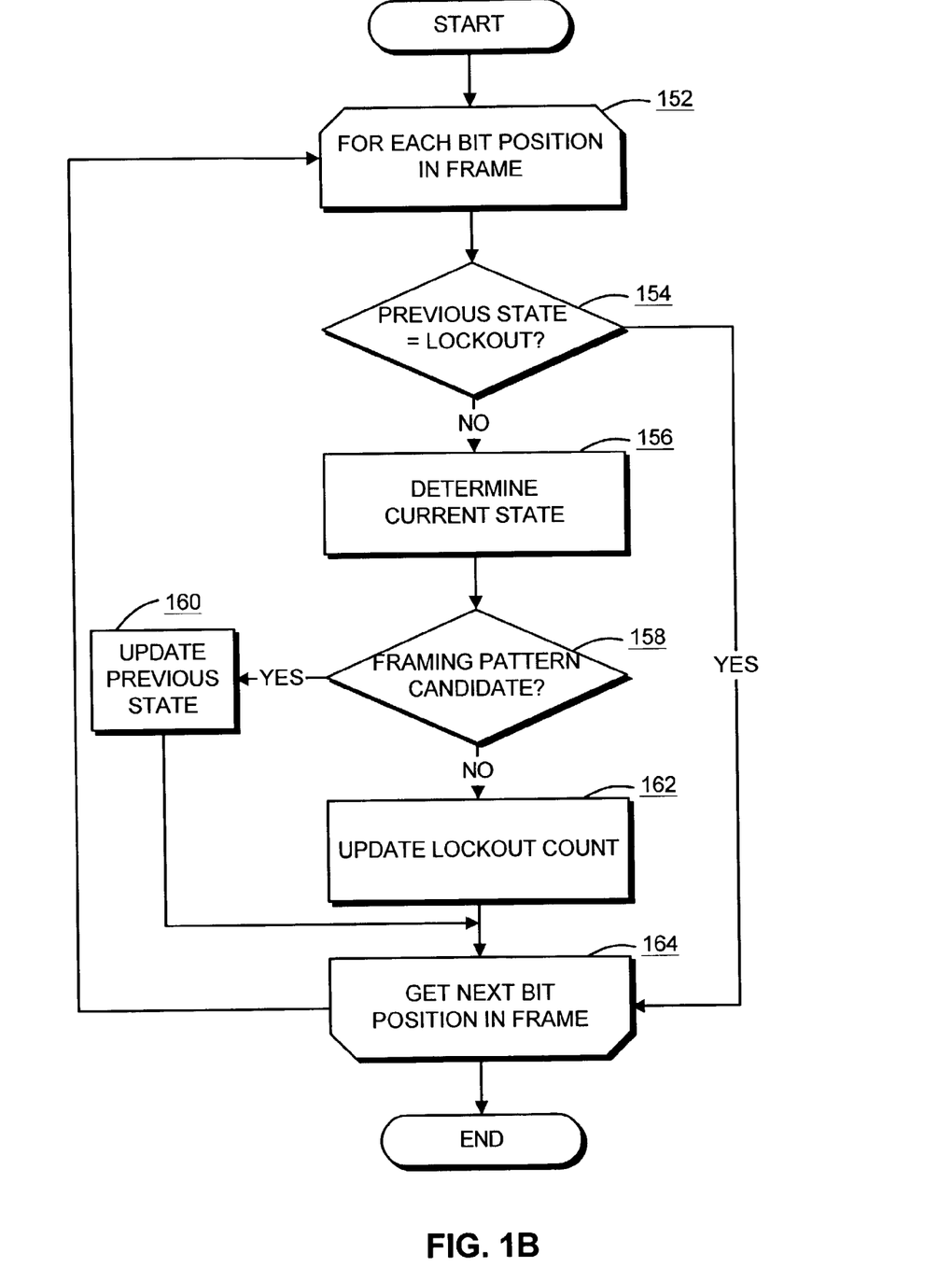
FIG. 1B shows a method for detecting a frame synchronization pattern in accordance with an embodiment of the present invention.

FIG. 1B illustrates a method for detecting a framing pattern in a serial bitstream in accordance with an embodiment of the present invention. Referring to FIG. 1B, each bit position in a data block the size of a frame is checked to see if it is a framing candidate (152). In particular, when a new bit is received in a given bit position, the previous framing state for that bit position is checked to determine whether that bit position has already been ruled out as a framing candidate (154). If it has been ruled out (i.e., a "Yes" exit from block 154), then the next bit of the signal is received and the process shown in FIG. 1B repeats itself. If, on the other hand, the previous framing state for the bit position indicates that is has not been ruled out as a potential framing candidate (i.e., a "No" exit from block 154), then the current state for the bit position is determined based on the previous state and the value of the new bit (156).

If the current state indicates that the bit position is still a framing pattern candidate (i.e., a "Yes" exit from block 158), then the current state for the bit position is stored (160), and the process repeats itself for the next bit position (164). If, on the other hand, it is determined that the bit position is no longer a framing candidate (i.e., a "No" exit from block 158), then a running total of the number of consecutive bit positions that have previously been ruled out as framing candidates is updated (162), and the process is repeated for the next bit position (164).

An example implementation of a frame detector is described below. The example is based on a telecom frame that is 772 bits long, with one bit per frame reserved for a framing pattern. The framing pattern is six bits long (spread over 6 frames) and is "001011". It will be appreciated that the techniques illustrated by this example are readily applicable to telecom frames of different sizes and with different framing patterns.

Figure 2:
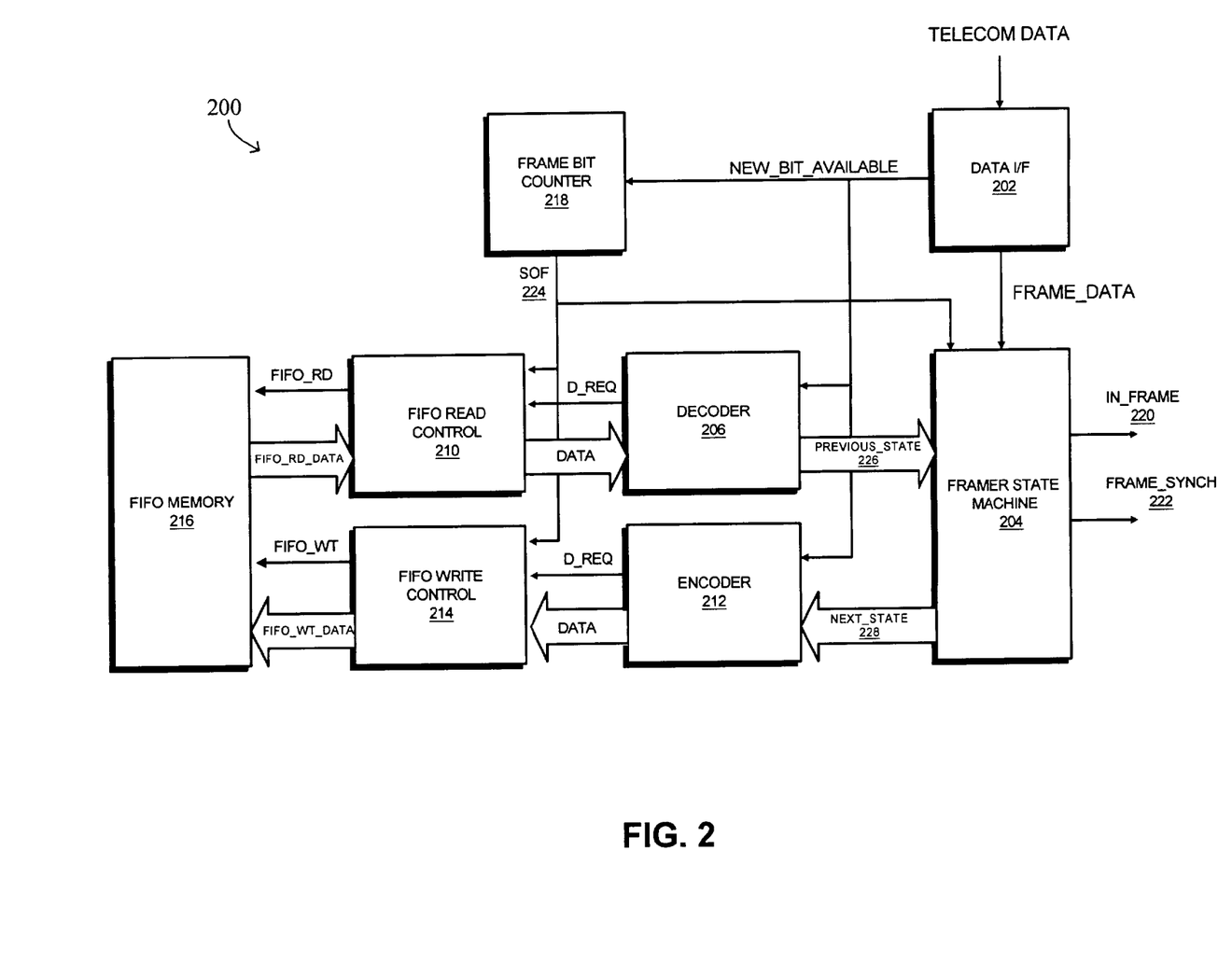
FIG. 2 shows an illustrative framing circuit in accordance with an embodiment of the present invention.

FIG. 2 is a block diagram of a framer circuit 200 in accordance with an embodiment of the present invention. As shown in FIG. 2, framer circuit 200 includes a data interface 202 for receiving the telecommunications signal and making it available, typically one bit at a time, to the rest of framer circuit 200. Framer circuit 200 also includes a framer state machine 204 for detecting the framing pattern, an encoder 212 and decoder 206 for encoding and decoding state data, memory 216 for storing the state data, memory read control 210 and write control 214 for interfacing with memory 216, and a counter 218 that provides a synchronization signal for use by the rest of framer circuit 200.

Framer State Machine

Framer state machine 204 checks for illegal transitions within each bit position in the received telecommunications frame. An illegal transition is a sequence of bits that is not part of the defined frame synchronization pattern. To determine the NEXT_STATE 228 for a given bit position, framer state machine 204 uses the PREVIOUS_STATE 226 for that bit position, retrieved from decoder 206, along with the new data bit received from data interface 202. When an illegal transition is detected in a given bit position, that bit position's state is set to the LOCKOUT state and is no longer considered as a potential holder of the frame synchronization pattern. When a legal transition is detected, that bit position's state is set to a legal state and that bit position remains in consideration as a potential holder of the frame synchronization pattern. If there is only one valid frame synchronization bit per frame, all bit positions but one will eventually transition to the LOCKOUT state. Framer state machine 204 declares an in-frame state when there is only one candidate left.

Figure 3:
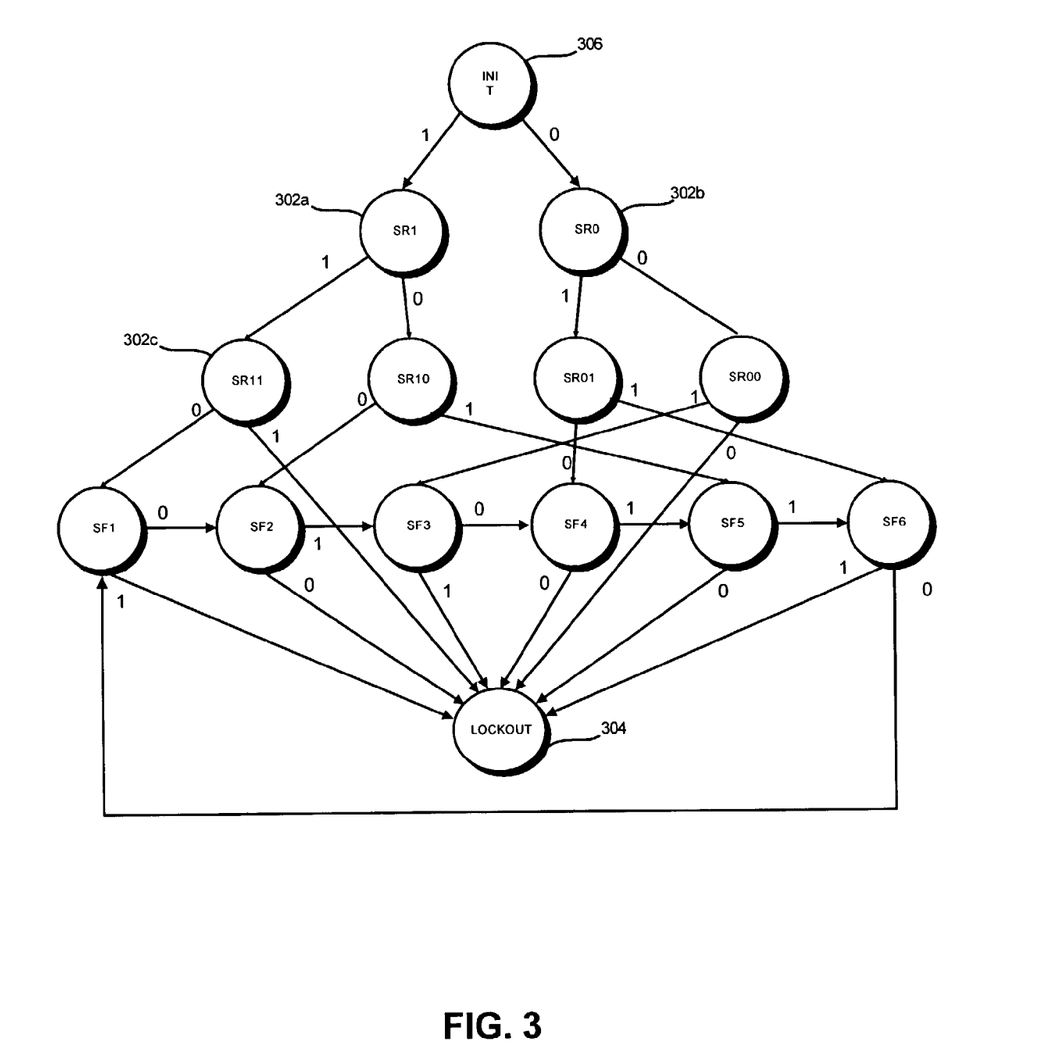
FIG. 3 is a state diagram for a framing state machine in accordance with an embodiment of the present invention.

FIG. 3 shows an example implementation of a state machine for determining the NEXT_STATE signal 228 for a framing pattern of "001011". Referring to FIG. 3, each state is represented by a circle, and, when a new bit is received in a given bit position, the current state for that bit position transitions to another state, as indicated by the arrows in FIG. 3. For example, when the first bit in a given bit position is received, the state for that bit position transitions from initial state 306 to state SR1 302*a* if the bit is a 1, and to state SR0 302*b* if the bit is a 0. Similarly, from state SR1 302*a*, if the next bit that is received in that bit position is a 1, then the current state for that bit position transitions to state SR1 302*c*, and so forth. Once an "illegal" sequence is detected, the LOCKOUT state 304 is entered. For example, if a 1 is received while in state SR11, then that bit position's state is set to LOCKOUT state 304, since the sequence "111" does not appear in the framing pattern "001011." Notice that active candidates remain in the active states (any state other than LOCKOUT state 304), while candidates that have reached LOCKOUT state 304 remain there until the framer is reinitialized.

Table 1 shows an illustrative encoding scheme for the states shown in FIG. 3. The encoding scheme shown in Table 1 is designed to take advantage of the fact that all bit positions except the one that contains the actual framing pattern will eventually move to the LOCKOUT_STATE. The lockout state is encoded with as few bits as possible to provide data compression and to use less memory.

TABLE 1

| State | Bit Code |
|---|---|
| SR0 | 10000000 |
| SR1 | 10000001 |
| SR00 | 10000010 |
| SR01 | 10000011 |
| SR10 | 10000100 |
| SR11 | 10000101 |
| SF1 | 10000110 |
| SF2 | 10000111 |
| SF3 | 10001000 |
| SF4 | 10001001 |
| SF5 | 10001010 |
| SF6 | 10001011 |
| INIT | 10001111 |
| LOCKOUT | 0NNNNNNN |

Each state uses 8 bits of memory for storage and is delineated by a leading "1," except for the LOCKOUT state which is delimited with a leading "0". The encoding for the LOCKOUT state includes 7 bits reserved as a "LOCKOUT count" ("NNNNNNN" in Table 1) describing the number of frame bits in a row that have progressed to the LOCKOUT state. In this example, the lockout count can range from 1 to 128. Note that in a preferred embodiment a lockout count value of "0000000" is used to represent a lockout count of one, since a lockout count of zero is not needed.

As bit locations that are not real frame synchronization patterns progress to the LOCKOUT state, the LOCKOUT count provides increasing data compression. For example, it is possible to implement a frame synchronizer using the encoding scheme shown in Table 1 with a 72 bit memory, where 72 bits represents the storage required for one frame pattern state of 8 bits, and 8 LOCKOUT states of 8 bits each. Note that framing time (framer performance) is directly related to the size of the memory. Smaller memory generally means a slower framing time.

It will be appreciated that while the encoding scheme shown in Table 1 is provided for purposes of illustration, other encoding schemes could be used instead without departing from the principles of the present invention. For example, if it were determined that one or more other states occurred with relatively high frequency, those states could be encoded in a manner similar to that used to encode the LOCKOUT state in Table 1. Alternatively, or in addition, in some embodiments a variable length encoding could be used for the LOCKOUT state. For example, LOCKOUT sequences of less than, e.g., four bits could be represented by an encoding such as, e.g., "00NN" (representing sequences of 1-4 bits), while longer LOCKOUT sequences could be represented by an encoding such as, e.g., "01NNNNNN" (representing sequences of 5-68 bits). Such an encoding could reduce the amount of memory required at the start of the framing process, when a relatively large number of mimics, and a relatively high number of short LOCKOUT sequences, will often be present. However, such an implementation may add some complexity to the logic used to interpret the state encodings. In other embodiments, the encoding for the LOCKOUT state could simply consist of a single bit (e.g., "0"), and an additional indication of the number of consecutive lockout states could be dispensed with entirely. These are but a few examples of alternative encoding schemes that could be used in accordance with the principles of the present invention.

Referring once again to FIG. 2, frame synchronizer 200 asserts the IN_FRAME signal 220 when all but one of the framing candidates have transitioned to the lockout state. The FRAME_SYNCH signal 222 is active for each bit that is an active framing candidate. Thus, when framer circuit 200 asserts IN_FRAME signal 220, there is only one FRAME_SYNCH pulse per frame.

Figure 4:
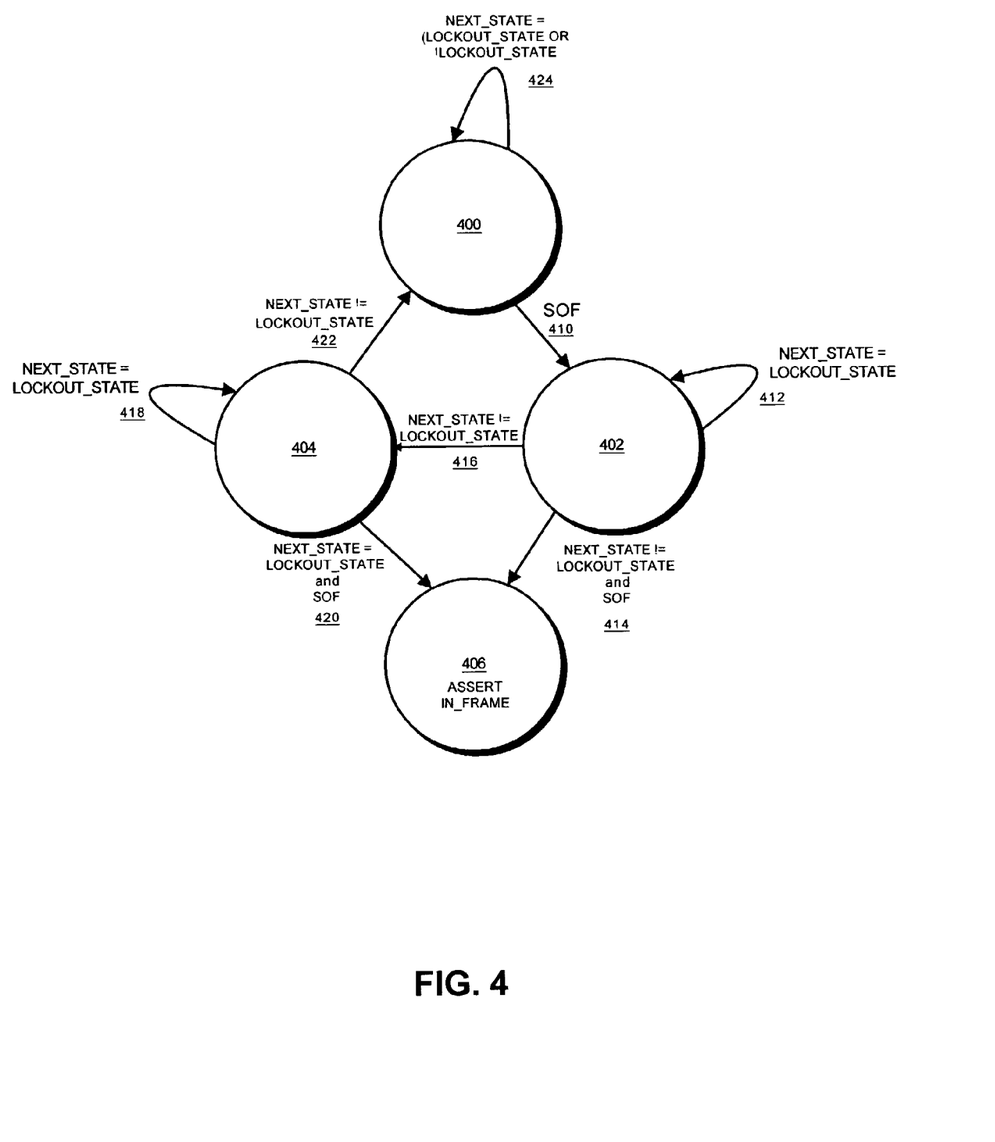
FIG. 4 is a state diagram describing the operation of a function that determines when a frame synchronization pattern has been detected.

FIG. 4 shows an illustrative implementation of a state machine for determining when to assert the IN_FRAME signal 220. In general terms, the state machine is operable to detect whether a given frame of data contains more than one bit position that has not been assigned to the LOCKOUT state. In particular, upon receipt of a start-of-frame (SOF) signal 410, a transition is made to state 402. As additional bits are received, the states for their respective bit positions are checked, and the state machine remains in state 402 (412) until a bit position with a non-lockout state is detected. When the first non-lockout state is detected, the circuit transitions to state 406 and asserts the IN_FRAME signal if the SOF signal is also asserted, since this indicates that there was only one non-lockout state in the previous frame (414). If the SOF signal is not asserted, however, the circuit transitions to state 404 instead (416). As additional bits are received, and the states for their respective bit positions checked, the state machine remains in state 404 (418) until a bit position with a non-lockout state is detected or the SOF signal is asserted. If the SOF signal is asserted while the circuit is in state 404, then the circuit transitions to state 406 and asserts the IN_FRAME signal (420), since this indicates that there was only one non-lockout state in the previous frame (and, thus, that the framing circuit has determined which bit position contains the framing pattern). If, on the other hand, a bit position with a non-lockout state is detected while the circuit is in state 404, then the circuit transitions to state 400 (422), since this indicates that there are at least two non-lockout states in the frame (and, thus, that the framer has not yet determined which bit position contains the actual framing pattern). Once the circuit has transitioned to state 400, it remains there until the next time the SOF signal is asserted, at which point it transitions to state 412 and repeats the process described above.

Note that if the SOF signal 410 is asserted before a non-lockout state is received in state 402, this indicates that all of the bit positions have transitioned to the LOCKOUT state, and, thus, that framing circuit 200 has failed to detect the framing pattern. When this happens, framing circuit 200 can initiate a suitable error recovery procedure, such as re-initializing itself. Note also that while the example frame synchronizer implementation described above declares an in-frame state once all mimics have dropped out and only one framing candidate remains, other implementations are possible. For example, one alternative is to use a threshold counter that declares an in-frame state as soon as any single candidate exhibits the framing pattern for a predefined number of frames.

Decoder

As indicated above, upon receipt of a new bit of data in a given bit position, framer state machine 204 uses the new bit, in combination with previous-state data for that bit's position in the frame, to determine if that bit position is a potential holder of the frame synchronization pattern. In the example shown in FIG. 2, framer state machine receives the new bit from data interface 202 and receives PREVIOUS_STATE data 226 from decoder 206. As described in more detail below, to provide PREVIOUS_STATE data 226, decoder 206 requests data as needed from FIFO read control 210 and decodes it into the state data used by framer state machine 204. For some bit positions, decoder 206 retrieves the previous state data directly from memory 216. However, for other bit positions, the decoder does not need to read anything directly from FIFO 216, since some bit positions will have been previously ruled out as frame synchronization candidates, and will have been encoded in the compressed form shown in Table 1—i.e., as part of a sequence of lockout states. For bit positions that form part of such a sequence of lockout states, the decoder can simply maintain a count of the number of consecutive lockout states (i.e., LC_CNT), and need not access FIFO memory 216 until the entire sequence of locked out bits is received (i.e., when LC_CNT is decremented to zero).

Figure 5:
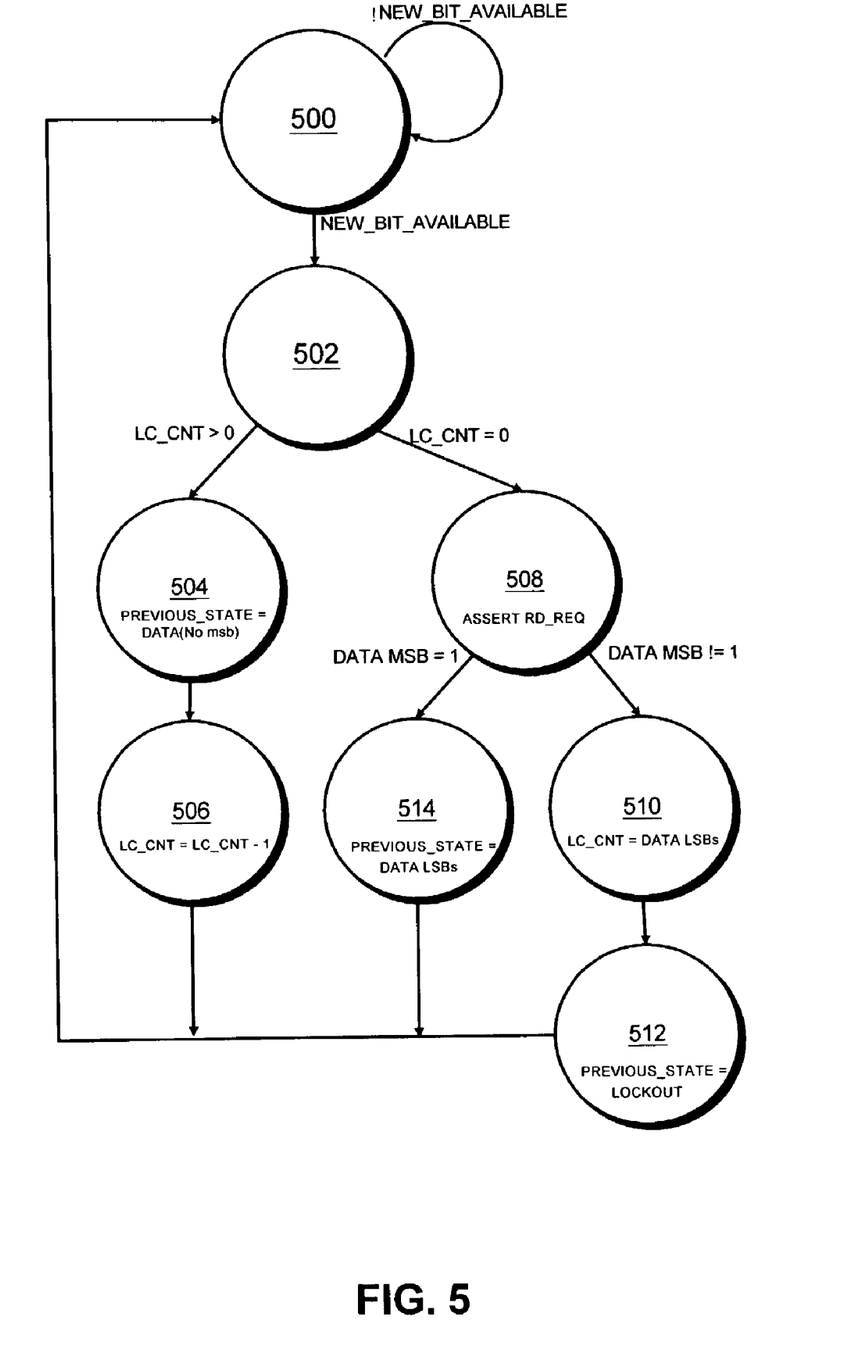
FIG. 5 is a state diagram for a decoder in accordance with an embodiment of the present invention.

FIG. 5 is a state diagram of an illustrative implementation of decoder 206 that makes use of the encoding scheme shown in Table 1. As shown in FIG. 5, the decoder waits for a new bit to become available (500). When a new bit becomes available to be checked by the framer, the decoder determines if the lockout count is greater than zero (502). If the lockout count is greater than zero (i.e., a "LC_COUNT>0" exit from state 502), this indicates that the new bit is in a bit position that previously entered the lockout state. The decoder sets the PREVIOUS_STATE to reflect this fact (504), decrements the lockout count (506), and returns to state 500 to await the next bit of data. If, on the other hand, the lockout count is equal to zero (i.e., a "LC_COUNT 0" exit from state 502), decoder 206 retrieves the previous-state information for that bit position from FIFO memory 216 (508), and decodes it. For the encoding scheme shown in Table 1, this involves looking at the first bit of the previous state data to determine if it is a valid state (i.e., if its most significant bit (MSB) is a 1), or if it is a lockout state (i.e., if its MSB is 0). If the MSB is a 0, decoder 206 retrieves the next seven bits from FIFO memory 216, sets the lockout count to the value specified by those bits (i.e., the lockout count "NNNNNNN" shown in Table 1)(510), and sets the PREVIOUS_STATE to the lockout state (512). If the MSB is a 1, decoder 206 retrieves the next 7 bits and sets the PREVIOUS_STATE to that value (514).

Encoder

Referring once again to FIG. 2, encoder 212 receives the NEXT_STATE data from framer state machine 204 and encodes it for storage in accordance with the encoding scheme that is being used (e.g., the encoding scheme shown in Table 1).

Figure 6:
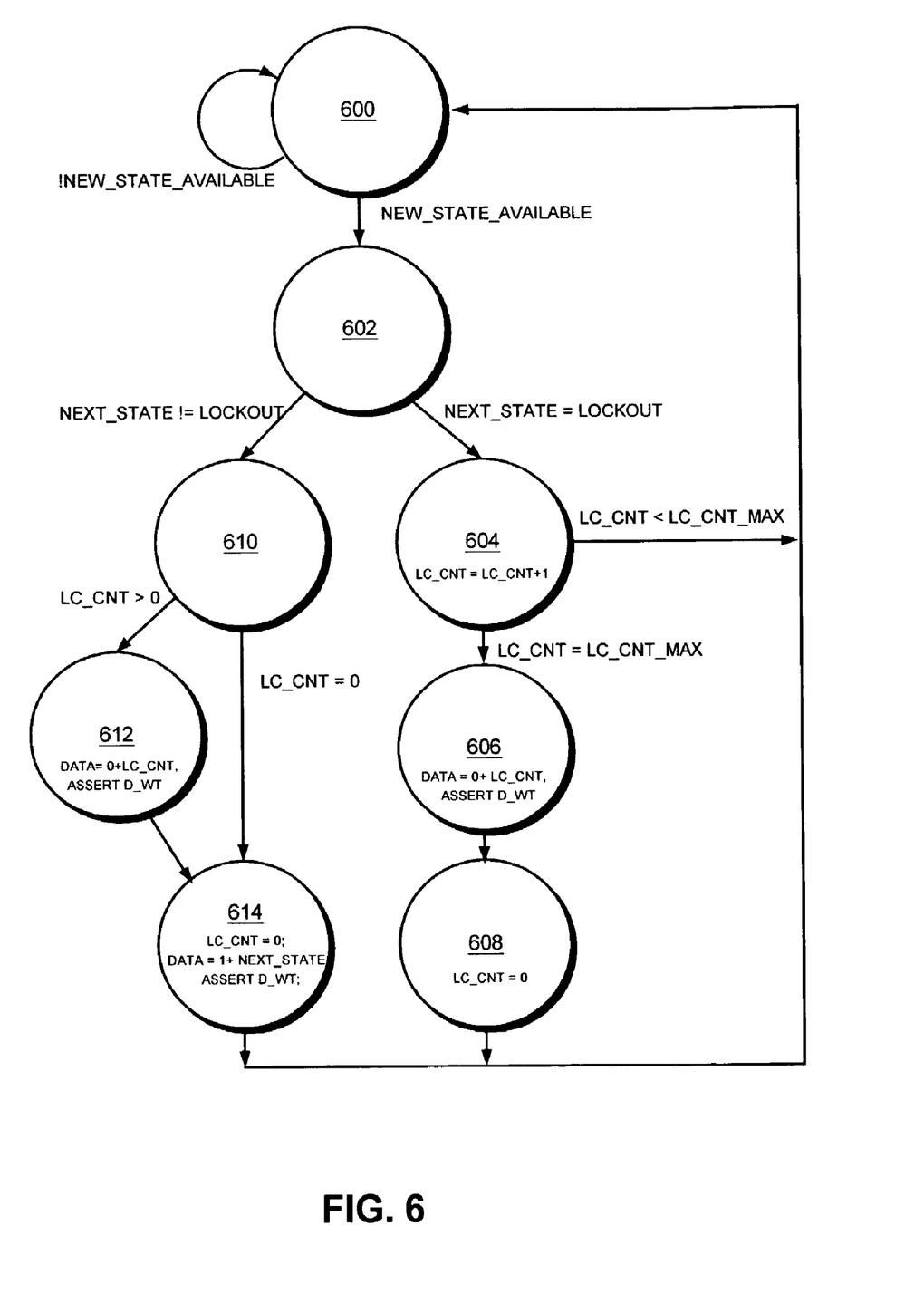
FIG. 6 is a state diagram for an encoder in accordance with an embodiment of the present invention.

FIG. 6 is a state diagram for an illustrative encoder. When new next-state data is available for storage (i.e., a transition from states 600 to 602), encoder 212 checks to see if the new state data is for a lockout state (602). If the new state is a lockout state, the encoder's lockout count (LC_CNT) is incremented (604). When LC_CNT reaches some maximum allowed value, LC_CNT_MAX (e.g., "1111111" in the example encoding scheme shown in Table 1), the lockout count code word is sent to FIFO Write Control 214 for storage (606), and LC_CNT is reset to zero (608). Referring back to state 602, if the new next-state data is not for a lockout state, then the current lockout count is saved to memory, if necessary (i.e., if it is a non-zero amount) (610), and the new next-state data is also saved (612) (where, in FIG. 6, the notation "1+NEXT_STATE" denotes the concatenation of a leading 1 to the NEXT_STATE data, as dictated by the encoding scheme shown in Table 1).

FIFO Memory

The storage function in the example implementation shown in FIG. 2 is performed by a FIFO (First In First Out) memory 216. State data is written to FIFO 216 starting from when the SOF signal is asserted until the SOF is asserted again or the FIFO becomes full. The FIFO write pointer does not overtake the FIFO read pointer because the data encoding scheme is such that the state information for the next frame of data is the same size or smaller than the state information for the current frame. The size of the memory and the statistical nature of the data determine how long it takes before compression enables state information for an entire frame's worth of bit positions to be stored within the memory. Once this condition has been reached, the framer speed will be on par with a memory intensive basic framer that provides a dedicated memory location for each bit location in the frame. Acceptable framing times can be achieved with significantly reduced memory sizes versus such a traditional frame synchronizer design. This is especially advantageous in systems designed to handle multiple channels of telecommunications streams, each with its own frame synchronizer, since the cost of adding even a relatively small amount of memory to the implementation of each frame synchronizer can quickly multiply the memory costs of the system as a whole.

FIFO Read Control

FIFO Read Control 210 retrieves data from FIFO memory 216 based on requests from decoder 206. If FIFO memory 216 is not full, meaning that there is room in FIFO 216 for additional state data, an INIT state is returned.

Figure 7:
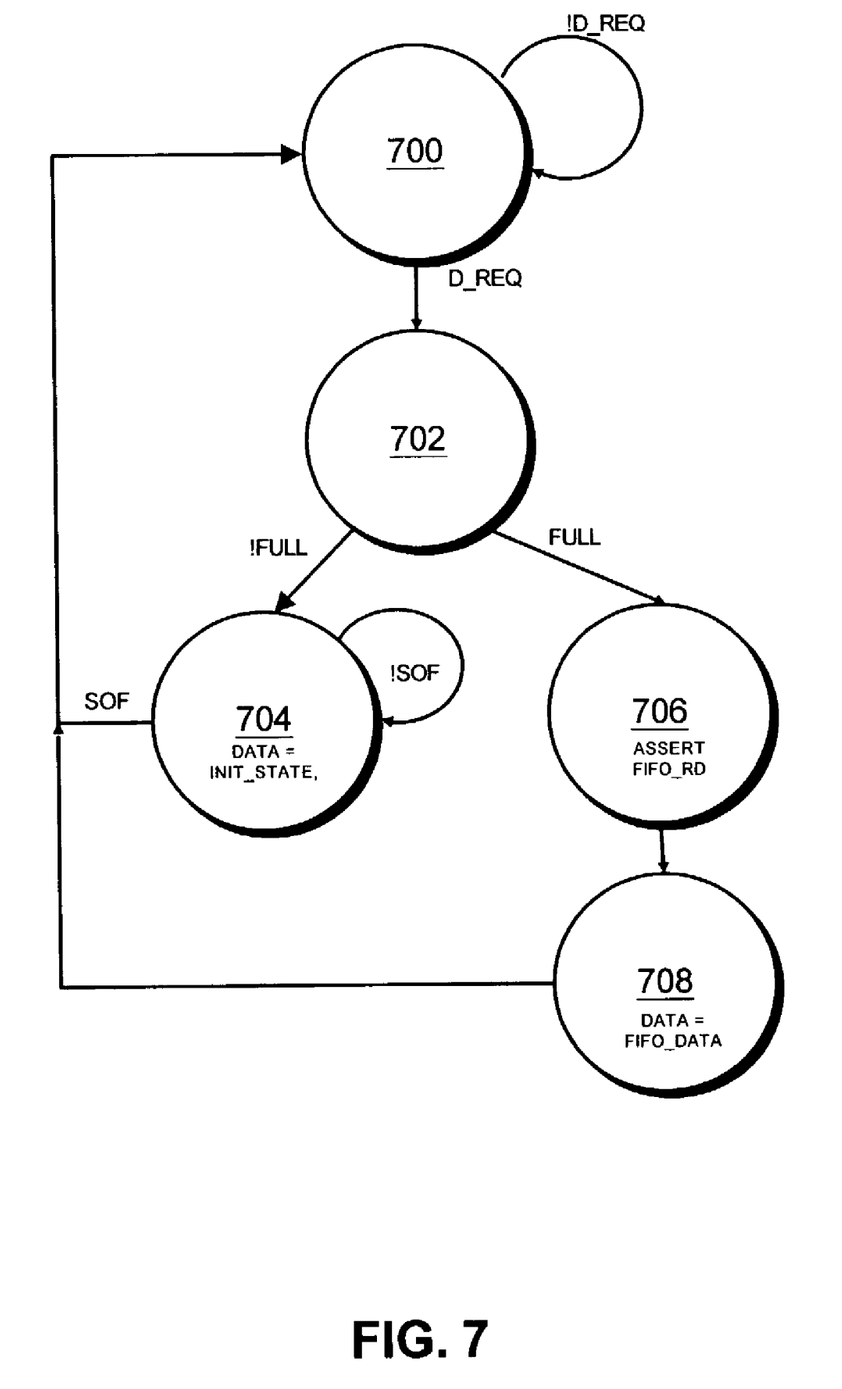
FIG. 7 is a state diagram describing the operation of memory read control logic in an embodiment of the present invention.

FIG. 7 illustrates the operation of FIFO Read Control 210 in an embodiment of the present invention. Referring to FIG. 7, FIFO Read Control 210 waits for a data request (D_REQ) (700). Upon receipt of a data request, FIFO Read Control 210 determines if FIFO 216 is full (702). If FIFO 216 is not full, FIFO Read Control 210 returns an INIT_STATE, and continues to return the INIT_STATE for further requests until the start-of-frame signal is asserted again (704). If FIFO 216 is full (i.e., FIFO 216 is already fully populated with previous-state data), then FIFO Read Control 210 asserts the FIFO_RD signal and reads data from FIFO 216 (706). FIFO Read Control 210 then returns the data from FIFO 216 to decoder 206 (708).

FIFO Write Control

FIFO Write Control 214 writes data to FIFO 216 on request from encoder 212. If FIFO 216 is full when a request to write data is received (as would be the case if all the bit states do not fit into memory yet), FIFO Write Control 214 does nothing until the next start of frame signal.

Figure 8:
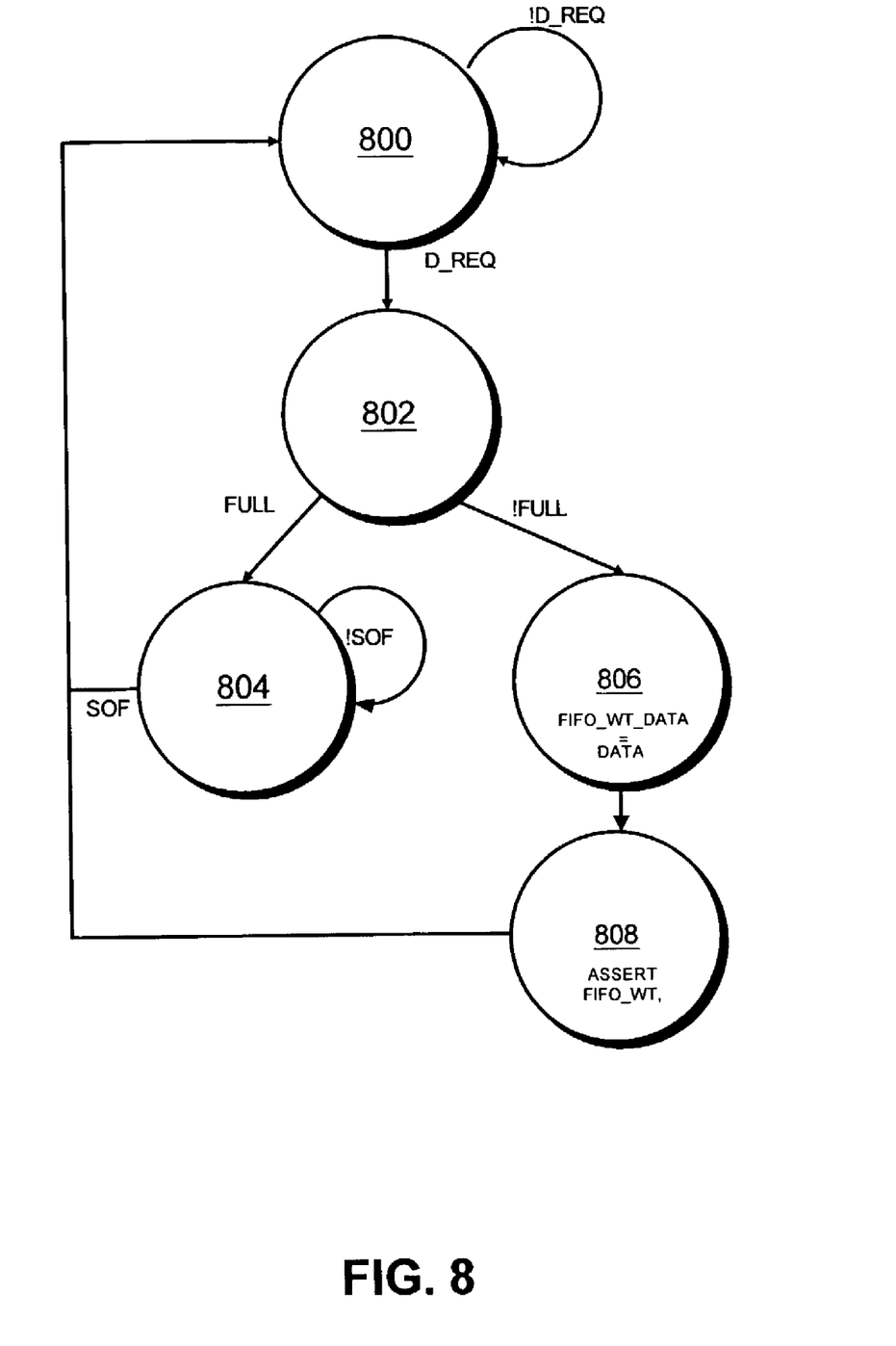
FIG. 8 is a state diagram describing the operation of memory write control logic in an embodiment of the present invention.

FIG. 8 illustrates the operation of FIFO Write Control 214 in an embodiment of the present invention. As shown in FIG. 8, FIFO Write Control 214 waits for a request to write data to FIFO 216 (800). Upon receipt of such a request, FIFO Write Control 214 checks to see if FIFO 216 is full (802). If FIFO 216 is full, FIFO Write Control 214 does nothing (804), and waits for the next start-of-frame signal before transitioning back to state 800. If FIFO 216 is not full, then FIFO Write Control 214 writes the data to FIFO 216 (806, 808).

Frame Bit Counter

As previously indicated, frame bit counter 218 provides an arbitrary start of frame (SOF) signal 224 for use by the other functional blocks of framer 200 when searching for the frame synchronization pattern. In one embodiment, counter 218 simply counts the bits of the telecommunications stream as they are received, and asserts the SOF signal when it has counted an entire frame's worth of bits. For example, if there are n bits in a frame, counter 218 generates a SOF signal every nth bit. Note that in the illustrative embodiment described above, frame bit counter 218 need not start counting at the beginning of an actual frame; as long as frame bit counter 218 generates one SOF signal per frame, framer 200 will operate correctly, regardless of where in the actual frame the SOF signal is asserted.

Although the foregoing invention has been described in some detail for purposes of clarity, it will be apparent that certain changes and modifications may be practiced within the scope of the appended claims. For example, it will be appreciated that while the example implementations described above make use of a FIFO memory for storing state information, any suitable form of memory could be used. One of ordinary skill in the art will also appreciate that any suitable way of reading from, or writing to, the memory unit could be used, and that the specific implementations described above are provided for purposes of illustration, not limitation. Similarly, it will be appreciated that different encodings could be used for the state information. Thus, it should be understood that there are many alternative ways of implementing both the processes and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A method for detecting framing data in a telecommunications signal performed by a framer circuit, the method comprising: retrieving previous-state information corresponding to a relative position of a received bit in a frame of the telecommunications signal; using the previous-state information to determine if the received bit is a candidate framing bit; if a determination is made that the received bit is a candidate framing bit, storing updated state information for the relative position of the received bit in the frame of the telecommunications signal, the updated state information indicative of the received bit being a candidate framing bit in a frame pattern; and if a determination is made that the received bit is not the candidate framing bit, storing compressed state information indicative of that determination, the compressed state information being stored includes a first code word indicating that the received bit is not the framing bit, the first code word having fewer bits than a second code word used to indicate that the received bit is a candidate framing bit, the first code word using fewer bits than the second code word to represent a state that occurs statistically more frequently than states represented by the second code word; and the determinations being used in detecting the framing data in the telecommunications signal.

2. A method as in claim 1, in which the first code word has associated with it a count of the number of consecutively received bits that have been determined not to be the framing bit.

3. The method as in claim 1, in which the effective amount of storage used to store the state information for a given bit position is capable of varying dynamically.

4. The as in claim 1, in which a measure of the degree to which the state information is compressed increases as additional bits are determined not to be the framing bit.

5. The method as in claim 1, further comprising:
    determining whether there is only one bit per frame that is a candidate framing bit; and
    declaring an in-frame state if it is determined that there is only one bit per frame that is a candidate framing bit.

6. The method as in claim 1, further comprising: declaring an in-frame state when one bit has exhibited a framing pattern for a predefined number of frames.

7. The method as in claim 1, in which the previous-state information is retrieved from a memory unit, and in which the updated state information is stored in the memory unit, the memory unit being dimensioned such that the complete state data for each bit position in a frame is unable to fit into the memory unit unless a certain amount of compression of the state data has been achieved.

8. A system for detecting framing data in a telecommunications signal, the system comprising: an interface operable to receive the telecommunications signal; a memory that stores encoded framing state data for a plurality of bit positions within a frame of the telecommunications signal, the encoded framing state data for a given bit position indicating whether a received bit corresponding to the given bit position forms part of a valid framing pattern; state update logic operable to determine a current framing state for the given bit position based on the received bit and a previous framing state for the given bit position; an encoder operable to encode the current framing state data for storage in the memory, the encoder using at least one data compression technique to encode at least one framing state; the at least one data compression technique using fewer bits to represent a framing state that indicates that a given bit position does not contain a bit in a valid framing pattern than are used to represent a framing state that indicates that a given bit position may contain a bit in a valid framing pattern; and the framing state that indicates that a given bit position does not contain a bit in a valid framing pattern occurs statistically more frequently than the framing state that indicates that a given bit position may contain a bit in a valid framing pattern; and the current framing state being used in detecting the framing data in the telecommunications signal.

9. The system as in claim 8, in which the at least one data compression technique comprises using a single code word to represent the current framing state data for a sequence of bit positions in a frame of the telecommunications signal, each bit position in the sequence having the same current framing state, the single code word comprising at least one bit to identify the current framing state, and a plurality of bits to represent the number of bit positions in the sequence.

10. The system as in claim 9, in which the memory is dimensioned such that it is able to store no more than a predefined number of distinct framing state code words at a given time, the predefined number being less than the number of bit positions in a frame of the telecommunications signal.

11. The system as in claim 9, in which the memory is capable of storing at least nine code words.

12. The system as in claim 8, further comprising a memory write-control logic operable to determine whether the memory is full, and to enable additional state information to be written to the memory if the memory is not full.

13. The system as in claim 8, in which the memory comprises a FIFO.

14. The system as in claim 8, in which the telecommunications signal comprises a DS1 signal.

\* \* \* \* \*